May 12, 1964 R. S. HOPKINS 3,133,273

MAGNETIC INFORMATION STORAGE ARRANGEMENTS

Filed Nov. 21, 1956 7 Sheets-Sheet 1

May 12, 1964 R. S. HOPKINS 3,133,273

MAGNETIC INFORMATION STORAGE ARRANGEMENTS

Filed Nov. 21, 1956 7 Sheets-Sheet 3

May 12, 1964 R. S. HOPKINS 3,133,273

MAGNETIC INFORMATION STORAGE ARRANGEMENTS

Filed Nov. 21, 1956 7 Sheets-Sheet 4

May 12, 1964 R. S. HOPKINS 3,133,273

MAGNETIC INFORMATION STORAGE ARRANGEMENTS

Filed Nov. 21, 1956 7 Sheets-Sheet 5

May 12, 1964 R. S. HOPKINS 3,133,273

MAGNETIC INFORMATION STORAGE ARRANGEMENTS

Filed Nov. 21, 1956 7 Sheets-Sheet 7

3,133,273

MAGNETIC INFORMATION STORAGE ARRANGEMENTS

Ronald Sydney Hopkins, London, England, assignor to Associated Electrical Industries (Woolwich) Limited, a limited company Filed Nov. 21, 1956, Ser. No. 623,734
Claims priority, application Great Britain Nov. 24, 1955
6 Claims. (Cl. 340—174.1)

This invention relates to magnetic information storage arrangements, in particular to such arrangements of the kind in which information stored on a continuously running magnetic storage device by selective magnetization of unit surface areas thereof has to be capable of being abstracted from the device, passed to a utilization circuit and thereafter re-stored on the device, with or without modification effected on utilization, at a position substantially corresponding to that from which it was abstracted. Arrangements of this kind, which will hereinafter be termed the kind specified, find application for instance, in connection with the metering of timed calls in automatic telephone exchange systems.

The use of magnetic drums, for the storage of information is well known in connection with digital computers, the information commonly being stored in the form of binary digits (namely having two possible values usually represented by "0" and "1" respectively) since this requires only two states of magnetization in which, respectively, the material of the drum surface is saturated in opposite directions. Briefly, these storage drums have a cylindrical surface of some suitable magnetic material along one or more circumferential tracks on which information can be stored by selective magnetization of unit surface areas each corresponding to one digit of the information. Information to be stored is "written" on to the drum by means of so-called writing heads of which there is at least one per track, and likewise the stored information can be "read" from the drum, when required, by means of so-called reading heads (again at least one per track) which may be separate from the writing heads or may be constituted by heads capable of fulfilling both functions. Each head essentially comprises a small magnetic element defining a magnetic circuit including an air gap and having a small coil linked therewith, the head being in use positioned with the air gap close to the drum surface. For writing, the coil is appropriately energized and the fringing magnetic field induced across the gap correspondingly magnetizes the area of the drum surface instantaneously opposite the gap. When reading, the field produced by the area of the magnetized drum surface instantaneously opposite the gap induces a corresponding flux in the magnetic element of the head and results in a corresponding output being obtained from the coil. Usually amplifiers are required both for the reading out and the writing in of information.

Instead of being in the form of a drum the storage device may equivalently take the form of a magnetic disc or continuous tape on which information is stored along one or more continuous tracks. The circulation of stored information from the device through a utilization circuit and back to the device as required in arrangements of the kind to which the invention particularly relates, involves certain difficulties due to the requirement of re-storing the abstracted information in a position substantially corresponding to that from which it was taken.

In one known arrangement of this kind employing a magnetic drum, each storage track has separate writing and reading heads which are disposed at diametrically opposite positions on the track. Information is read from the area of the storage track instantaneously beneath the reading head, passed through the utilisation circuit and re-stored in the area of the storage track instantaneously beneath the writing head. This means, in effect, that all the information stored on the drum has two storage positions which it occupies alternately, and consequently only half the capacity of the drum is in effective use. Moreover a high degree of mechanical accuracy is required in aligning the diametrically opposed heads.

In another known arrangement a single head which performs both writing and reading functions is associated with each storage track, the use of a single head being possible since owing to distortion in the shape of the output waveform from the head when reading, the peaks of the output occur somewhat before the corresponding reading head, passed through the utilization circuit and peaks of the input required for re-storing the information; there is therefore an interval between the time at which the output wave form is detected and that at which the re-writing input is required, which interval is sufficient for the operation of the utilization circuit. An advantage of this arrangement is that the whole length of each storage track can be effectively used for storing information. However when a single head is used in this manner the input side of a high-gain amplifier for reading out usually requires to be coupled to the same terminals as the output side of a powerful amplifier for writing in: consequently the action of writing information on to the storage device tends to result in the reading amplifier being paralyzed for a short time period during which, therefore, information cannot be read out. The paralysis time can be made very short by using a specially constructed head and limiting amplifiers, but the disadvantages of having to provide these may outweigh the advantages of being able to use the full length of the track: in any case, there would still be a short paralysis period which would require the unit storage areas to be spaced further apart along the track, thus reducing the overall capacity of the device.

The present invention has as an object the provision of a magnetic storage arrangement of the kind set forth which avoids at least some of the above noted drawbacks.

According to the invention, in a magnetic storage arrangement of the kind specified, there is provided pulse means in the form of pulse trains for defining recurrent pulse periods synchronously with operation of the storage device, and information abstracted from one storage track on the storage device during one period is applied during such period for temporary storage in another track and during a subsequent period is returned to the first track for re-storage therein at substantially the same position as that from which it was abstracted, a utilization circuit being arranged to receive and utilize such information during the process of transferring it from one track to the other on at least one of said periods. It is to be understood that utilization of information by the utilization circuit may or may not be accompanied by modification of the information, it being then the modified information that would be re-stored in the original track.

To this end the arrangement may comprise, in operative combination with the utilization circuit, two heads associated with respective storage tracks on the drum and each capable of performing both writing and reading functions, together with means for rendering said heads respectively effective for reading and writing and for periodically inter-changing the functions of the two heads synchronously with the movement of the storage device and at such times that information read by one head and passed through the utilization circuit to the other during any one cycle of movement is read by said other head and returned to the first in a subsequent cycle.

In carrying out the invention, especially where the latter is used in connection with automatic telephone metering as mentioned, it is contemplated that the functions of the two heads will be interchanged once per cycle of movement of the storage device so that during one cycle information read from the one track will be passed through the utilization circuit for storage, with or without modification, on the other track, and that on the next cycle the same information will be returned from the latter track and re-stored in the first track substantially at the same position in the track as it was previously stored.

It is conceivable however that interchange of the functions of the heads may be effected an odd number of times per cycle of movement or only once in every two (or more) cycles, this latter mode of operation being required, for instance, if information is to be abstracted from the device only on, say, alternate cycles rather than on each cycle.

With the arrangement of the invention, which will include the usual reading and writing amplifiers, the reading amplifiers will have time to recover from paralysis caused by a writing operation since each head is used only for reading or only for writing during the relatively long periods between successive interchanges of its function. Moreover no mechanical difficulty is encountered in setting the heads because they do not have to be accurately aligned as when using two heads on a single track.

The heads used for the purposes of the present invention preferably have separate reading and writing coils linked with respective magnetic circuits each defining a gap, the two gaps thus provided in each head being so spaced that the time for a unit storage area on the storage device to pass from the reading gap to the writing gap is approximately equal to or slightly greater than the time taken for a unit of information to be passed from the one head, through the utilization circuit, to the other head. By suitably selecting the spacing of the two gaps in each head the inherent delay between the reading of information from one track and its storage in the other can be compensated for; moreover each digit of information will be read out with the reading head slightly in advance of the centre of the unit area in which the digit is stored, this being advantageous since the greatest difference between a "0" and "1" condition can then be realized.

In further describing the invention and various embodiments thereof, reference will be made to the accompanying drawings in which.

Figure 1:
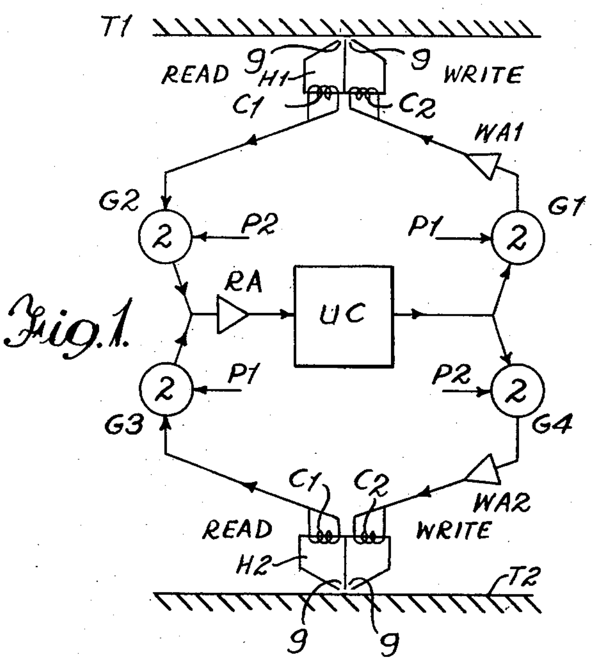
FIG. 1 is a symbolic diagram of a basic embodiment of the invention.
Figure 2:
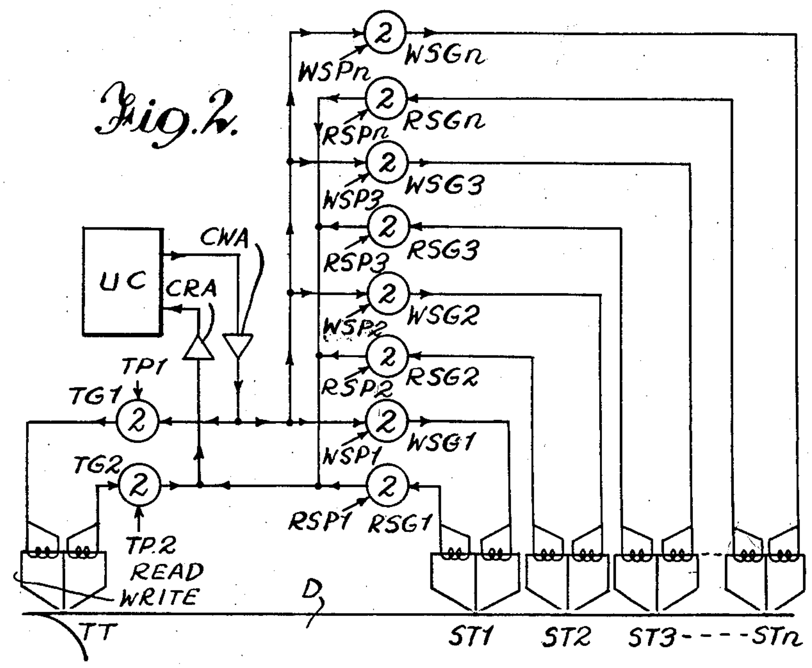
FIG. 2 is a symbolic diagram of an embodiment in which a number of storage tracks share a single transfer track.
Figure 3:
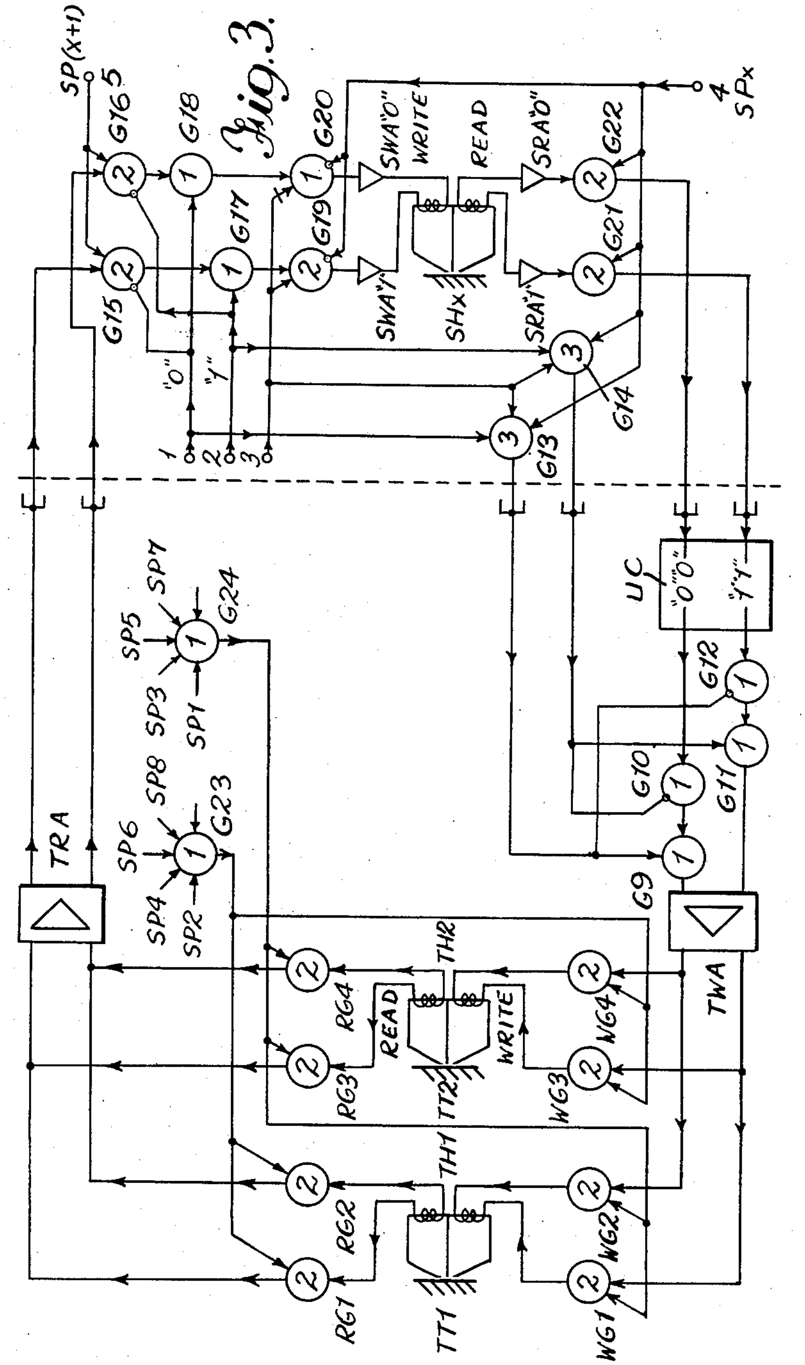
FIG. 3 is a symbolic diagram of an embodiment in which a number of storage tracks share a pair of transfer tracks used alternately.
Figure 4A:
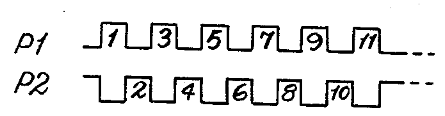
Figure 4B:
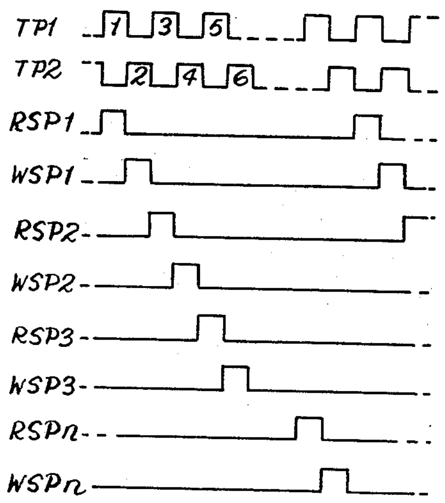
Figure 4C:
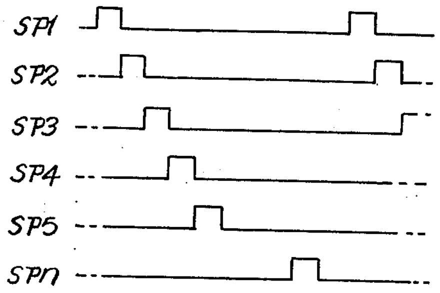
Figure 5:
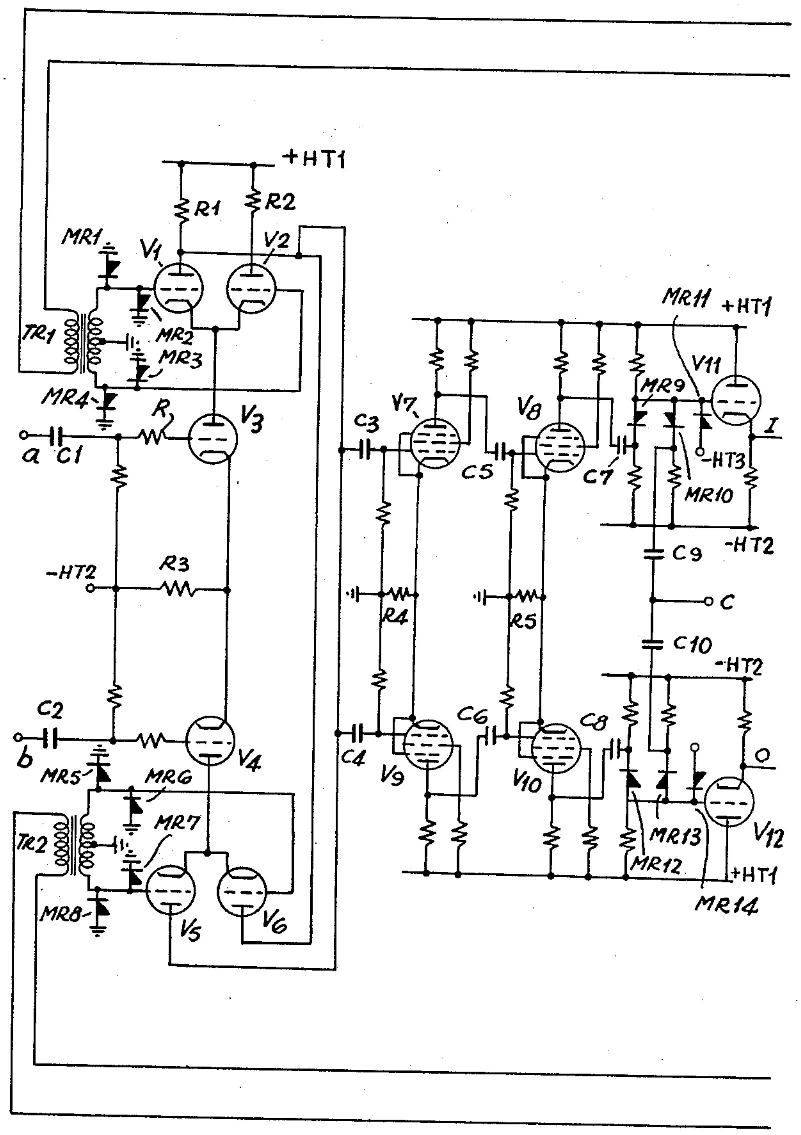
Figure 6:
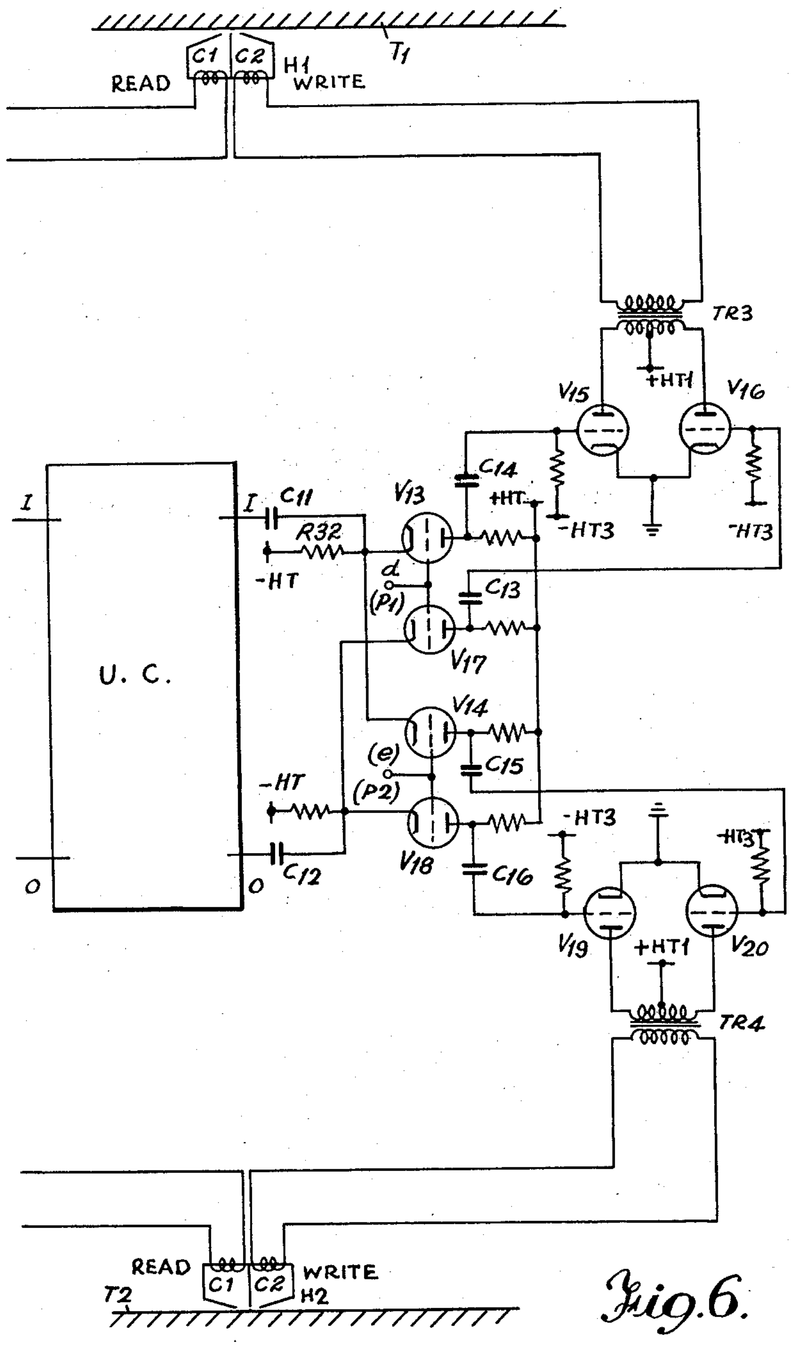

FIGS. 4*a*, 4*b* and 4*c* illustrate pulse means in the form of trains of various pulses required for the operation of the embodiments of FIGS. 1, 2 and 3 respectively;

FIGS. 5 and 6, when placed together with FIG. 6 on the right of FIG. 5, illustrate practical circuit details for the embodiment of FIG. 1, and FIGS. 7–12 illustrate practical circuits for the various switching (gating) circuits indicated symbolically in FIGS. 2 and 3.

In the symbolic diagrams of FIGS. 1, 2 and 3 the various switching circuits, since they perform a gating function, have been indicated by a conventional gate symbol consisting of a circle, a number of input leads carrying an arrowhead directed towards the circle, and an output lead carrying an arrowhead directed away from the circle. The numeral inside the circle indicates that the gate can provide an output signal when and only when that number of input leads (excluding any input leads terminated by a small circle such for instance as the input lead to the gate G12 from the gate G13 in FIG. 3) are appropriately stimulated, the gate being said to be "opened" to pass a signal on one input lead when another one or more input leads, as required to make up said number, are appropriately stimulated. The appropriate stimulus for an input lead having a transverse bar behind its arrowhead is the absence of any signal on such lead, while the appropriate stimulus for any input lead neither having such bar nor terminated by a small circle is the presence of a signal on that lead. A signal on an input lead terminated by a small circle inhibits opening of the gate irrespective of whether or not the other input leads are stimulated. Practical circuits for the various gates in FIGS. 1, 2 and 3 will be described later in connection with FIGS. 5–12.

Referring to FIG. 1, two magnetic storage tracks indicated at T1 and T2 and assumed to be on a magnetic drum are respectively associated with heads H1 and H2 each capable of performing both reading and writing functions and both being of the preferred form previously mentioned, namely having separate reading and writing coils *c*1 and *c*2 linked with respective magnetic circuits each defining a gap *g* close to the associated track.

The reading coils *c*1 of the two heads H1 and H2 are connected through respective "read" switching gates G2 and G3 to the input side of a common reading amplifier RA the output from which is fed to the input of a utilization circuit UC. After utilizing information received from one or other of the heads by way of the amplifier RA, the utilization circuit feeds from its output information that is to be re-stored on the drum to the writing coil *c*2 of one or other of the two heads via respective "write" switching gates G1 and G4 and respective writing amplifiers WA1 and WA2. Whereas a writing amplifier has been shown in FIG. 1 as being provided individually to each writing coil, this agreeing with the practical circuit of FIGS. 5 and 6 taken together, a single writing amplifier may, if desired, be provided in common to a plurality of writing coils as, for example, in the embodiment of FIG. 2.

In operation the switching circuits are controlled so as on odd-numbered revolutions of the drum to connect the reading coil of one head to the reading amplifier RA, and the utilization circuit UC to the amplifier WA1 or WA2 associated with the writing coil of the other head, and on even-numbered revolutions to interrupt the previously established connections and connect the reading coil of the second head and the amplifier associated with the writing coil of the first head to the reading amplifier and utilization circuit respectively. This action is governed by pulse trains P1 and P2 (FIG. 4*a*) of which the P1 pulses coincide with odd-numbered revolutions of the drum and are applied to the gates G1 and G3, while the P2 pulses coincide with even-numbered revolutions and are applied to the gates G2 and G4. Thus on each odd-numbered revolution, that is, during each P1 pulse period, the gate G3 is opened to connect the reading coil of head H2 to the reading amplifier RA, and gate G1 is opened to connect the utilization circuit UC to the writing coil of head H1 via amplifier WA1 with the result that information will be read from track T2, passed to the utilization circuit for utilization and possible modification, and applied to the writing coil of head H1 thereby to be stored in track T1. Likewise on even-numbered revolutions, that is, during the P2 pulse periods, gate G2 is opened to connect the reading coil of head H1 to the reading amplifier RA, and gate G4 is opened to connect the utilization circuit UC to the writing coil of head H2 via amplifier WA2, the information stored in track T1 during the previous odd-numbered revolution being then read off, passed to the utilization circuit and applied to the writing coil of head H2 of track T2, which latter coil will accordingly write the information back into the track T2 substantially at its original position therein.

If the information stored in any particular track is to be utilized and transferred to another track on, say, only every $(2n)$th revolution of movement of the drum, then the track to which such information is transferred could evidently be shared on a time division multiplex basis by $n$ such storage tracks, it being appreciated that information transferred to the shared track during one revolution would be returned to its original track on the next revolution to leave the shared track free.

FIG. 2 shows in schematic form an embodiment in which a single transfer track having associated head TT is shared as just indicated, by a plurality of storage tracks having associated heads ST1 . . . ST$n$ respectively, there being also a common utilization circuit UC and common reading and writing amplifiers CRA and CWA. The reading and writing coils of the head TT are connected to the amplifiers CRA and CWA through "write" switching gates TG1 and TG2 respectively controlled by applied odd-revolution and even-revolution pulse trains TP1 and TP2 (FIG. 4*b*) similar to the P1 and P2 pulse trains of FIG. 4*a*. The reading coils of the heads ST1 . . . ST$n$ are connected to the reading amplifier CRA through "read" switching gates RSG1 . . . RSG$n$ respectively controlled by applied pulses RSP1 . . . RSP$n$ occurring sequentially on successive odd-numbered revolutions of the drum D as indicated in FIG. 4*b*. Likewise the writing coils of the heads ST1 . . . ST$n$ are connected to the writing amplifier CWA through "write" switching gates WSG1 . . . WSG$n$ controlled respectively by applied pulses WSP1 . . . WSP$n$ (FIG. 4*b*) occurring sequentially on successive even-numbered revolutions.

Under control of the SP pulses the SG gates associate the utilization circuit and transfer track with each of the storage tracks in turn, each for a period of two revolutions. On the first of two such revolutions, the RSG gate opened by the RSP pulse occurring on that revolution connects the reading coil of the associated ST storage track head to the reading amplifier CRA, while the gate TG1, opened by the TP1 pulse occurring on the revolution in question, connects the writing coil of transfer track head TT to the writing amplifier CWA, with the result that information in the storage track concerned is read off, passed to the input of the utilization circuit for utilization and possible modification, and applied from the output of he utilization circuit to the transfer track: on the next revolution, the WSP pulse then occurring opens the WSG gate associated with the writing coil of the same storage track head, thereby connecting that coil with the writing amplifier CWA, the gate TG2 is opened by a TP2 pulse to connect the reading coil of the transfer track head TT to the reading amplifier CRA, resulting in the information which was stored in the transfer track on the previous revolution being read therefrom, passed to the utilization circuit and from there applied to the storage track concerned at substantially the same position as that at which it was originally stored. On the next two revolutions a similar process is repeated for another storage track, and so on, all the storage tracks being taken in this way in sequence.

In consequence of the use of a common writing amplifier there is an inherent limitation in the embodiment of FIG. 2 that new information cannot be inserted on any particular storage track at any instant but only on every $(2n)$th revolution. This limitation may, however, be overcome by employing a separate writing amplifier for each storage track.

The embodiment of FIG. 3 permits new information to be inserted at any instant into any one of a number of storage tracks. Moreover in this embodiment the storage tracks share two transfer tracks used alternately, each transfer track being in use for a period of two revolutions overlapping by one revolution the immediately preceding and succeeding periods of use of the other transfer track: that is, information transferred to one of the transfer tracks from one of the storage tracks during one revolution is transferred back to that storage track during the next revolution at the same time as information from another storage track is being transferred to the other transfer track for subsequent return on the next revolution again. Consequently, although the capacity of one track on the drum has been lost for storage, the stored information can be processed at twice the rate that it can with a single shared transfer track. Furthermore in the embodiment of FIG. 3 the stored information is utilized only during its transfer to one of the transfer tracks and not during its return, enabling a single utilization circuit to deal with all the stored information on the storage tracks concerned.

Referring to FIG. 3, the circuitry associated with the heads TH1 and TH2 for the two transfer tracks TT1 and TT2 is shown schematically on the left hand side of the dotted vertical line, while the circuitry associated with the head SH$x$ of one of the storage tracks, being the same as for all the other storage tracks, is shown on the right hand side of this line, the horizontal connections cut by the dotted line being common to the circuitry for all the storage tracks as indicated by the square brackets applied to these connections.

The equipment associated with the transfer tracks includes, in addition to the heads TH1 and TH2, "read" and "write" switching gates RG1 to RG4 and WG1 to WG4, reading and writing amplifiers TRA and TWA and gates G9 to G12, G23 and G24, these latter gates being so-called "or" gates giving an output signal on receipt of an input signal on a single input lead, unless inhibited. The circuitry associated with each storage track, such as that having the head SH$x$, includes gates G13 to G22, information input terminals 1 and 2 to one or other of which a signal is applied depending on whether a binary digit to be recorded has the value "0" or "1," a control terminal 3 to which a signal is applied whenever information represented by a signal on terminal 1 or 2 is to be written into a storage track, this latter signal being in the form of a pulse the timing of which determines the position at which the information is written into the track, a terminal 4 to which one of a series of time division multiplex pulse trains SP1 . . . SP$n$ (FIG. 4*c*) is applied, the particular pulse train for the storage track associated with head SH$x$ being denoted by SP$x$ in FIG. 3, and a terminal 5 to which is applied the next pulse train in the series, that is, the pulse train denoted by SP$(x+1)$, the pulses of which are the first to occur after those in the train applied to terminal 4. The pulse trains SP1 . . . SP$n$ are synchronized with the rotation of the drum as before so that each pulse coincides with and lasts for the duration of one revolution.

Information received at terminals 1 and/or 2 for storage in the track associated with head SH$x$ is applied via gates G17 and G18 to gates "write" G19 and G20. In the absence of a signal on terminal 3 gate G20 passes an output signal to the writing coil of head SH$x$ through amplifier SWA"0", thereby to write "0's" into the track. On coincidence of an input signal on terminal 2 with a writing control signal on terminal 3 an output signal is produced by gate G19 which is amplified by the amplifier SWA"1" to write a "1" into the appropriate position on the storage track. Gate G20 passes an input signal on terminal 1 to the write amplifier SWA"0" to write "0's" into the appropriate positions of the storage tracks.

During the period of an SP$x$ pulse applied at terminal 4 the gates G19 and G20 have an inhibit signal applied to them and therefore cannot pass information for storage on the track during that time. During the period of an SP$x$ pulse applied at terminal 4, the "read" gates G21 and G22 are open and information read out by the head SH$x$ and amplified in amplifiers SRA"1" and SRA"0" is passed to the input of the utilization circuit UC for processing. From the output of the utilization circuit the information is passed via gates G9 to G12 to one of the transfer tracks TT1 or TT2 for temporary storage therein, unless any new information to be stored in the storage track concerned arrives during the time of processing in which circumstance the new information is initially stored directly into its pertinent position in the transfer track instead of the storage track; otherwise the new information would be obliterated by that already existing when the information in the transfer track is subsequently restored in the storage track. This operation is achieved as follows:

The gates G13 and G14 are opened by the SP$x$ pulse to pass any new information received from the input terminals 1 and 2 coincidentally with a signal from terminal 3. From the gates the information by-passes the utilization circuit UC and is applied to gates G9 and G12 in the case of a "0" digit and gates G10 and G11 in the case of a "1" digit. The gates G9 and G11 simply pass the information towards the transfer tracks, while the gates G10 and G12 are inhibited by the information signals to prevent existing information fed out from the utilization circuit from passing through towards the transfer tracks.

The writing of information into the transfer tracks TT1 and TT2 is controlled by the gates WG1 and WG3 for "1" digits and gates WG2 and WG4 for "0" digits. Likewise the reading out of information from the transfer tracks is controlled by the gates RG1 to RG4. The switching actions of the RG gates and WG gates are respectively controlled by the outputs from the two "or" gates G23 and G24 of which G23 receives the even-numbered SP pulse trains (namely SP2, SP4 . . . and so on) on its respective input leads and G24 receives the odd-numbered pulse trains SP1, SP3 . . . and so on. Gates RG3, RG4, WG1 and WG2 are controlled by the output from gate G24 and are therefore opened on odd-numbered revolutions of the drum; gates RG1, RG2, WG3 and WG4 are controlled by the output from gate G23 so as to be opened on even revolutions.

Assuming that the SP$x$ pulse train is odd-numbered, the information from the storage track associated with head SH$x$, or new information to be stored in this track and received during the SP$x$ pulse period, will be stored in the transfer track TT1 since gates WG1 and WG2, controlled from the gate G24, are open during this period. On the next revolution of the drum, that is, during an SP$(x+1)$ pulse, information from another storage track will be read out, processed in the utilization circuit UC and passed towards the transfer tracks as before, being this time stored in transfer track TT2 since gates WG3 and WG4 are open at this time. During this same time gates RG1 and RG2 are also opened so that the information temporarily stored in transfer track TT1 will be read out, amplified by the common read amplifier TRA and applied to the gates G15 and G16 in all the circuitry associated with each storage track. Since the time period is that of an SP$(x+1)$ pulse the gates G15 and G16 for the storage track associated with head SH$x$ are opened to pass the information for re-storage in the storage track by way of gates G17 to G20. New information on the input terminals 1 and 2 is also given priority here over existing information, this being achieved by inhibiting gates G16 and G15 from the terminals 1 and 2 when a signal is present thereon.

It will be noted that in the embodiment of FIG. 3 writing amplifiers such as SWA"0" and SWA"1" are provided individually for each storage track, thereby permitting information to be written therein at any time, whereas the transfer tracks, into which information is written only sequentially, share a common writing amplifier TWA. Reading amplifiers are shown as provided individually for each storage track so that simple circuit details such as those of FIG. 7 may be used for the switching circuits G21 and G22. More complicated switching circuits such as those of FIG. 12 would be required if the reading coils of a number of storage track heads were to be coupled to a single common amplifier.

FIGS. 5 and 6 when placed together as already indicated give a complete circuit with the exception of the filament heating circuits for the valves, for the schematic diagram of FIG. 1, the circuit being laid out in a similar fashion to the schemtaic diagram. Considering the circuit of FIGS. 5 and 6 in its relation to FIG. 1, valves V1, V2 and V3 together with their associated components constitute the switching circuit G2, terminal $a$ being that to which the P2 pulses are applied; valves V4, V5 and V6 together with their associated components constitute the switching circuit G3, terminal $b$ being that to which the P1 pulses are applied; valves V7 to V12 together with their associated components constitute the reading amplifier RA, valves V7 to V10 constituting the amplifier proper and valves V11 and V12 constituting a pair of shaping gate circuits to which clock pulses derived from a clock track on the storage drum are applied at terminal $c$; valves V13 and V17, V14 and V18, together with their associated components, constitute the switching circuits G1 and G4, the terminals $d$ and $e$ being those to which the P1 and P2 pulses are respectively applied; valves V15 and V16 together with their associated components constitute the writing amplifier WA1; valves V19 and V20 together with their associated components constitute the writing amplifier WA2. The two tracks are indicated at T1 and T2 as before, and their associated heads at H1 and H2. The utilization circuit has again only been shown in block form since its detail circuitry will depend on the particular application of the invention, many possible circuits being known in the computer art, and need not be described for the invention to be fully understood.

The output from the reading coil $c1$ of the head H1 associated with the track T1 is stepped up by a transformer TR1 and limited by the rectifiers MR1 to MR4 to, say, plus or minus one volt, so that when the writing circuit is operating the peak voltage applied to the grids of the valves V1 and V2, by induction from the writing coil $c2$ into the reading coil $c1$, cannot exceed 2 volts: similarly with the output from the reading coil $c1$ of the head H2 associated with the track T2 (valves V5 and V6, transformer TR2, and rectifiers MR5 to MR8). This ensures that the relatively heavy writing current does not cause breakdown of the switching circuits and overloading of the reading amplifier RA. When a P2 switching pulse appears at terminal $a$ it is applied via capacitor C1 and resistor R to the grid of valve V3. This valve therefore conducts and its reduced anode potential lowers the cathode potential of valves V1 and V2 so that these valves conduct and act as a balanced amplifier by which signals from the reading coil $c1$ of the head H1, derived from the track T1, are "pre-amplified." The resultant outputs from the anodes of the valves V1 and V2 are applied to the input of the reading amplifier RA. During the period of a P1 switching pulse, that is, in the absence of a P2 pulse, valve V3 is cut off and valves V1 and V2 therefore do not conduct so that writing signals reaching their grids are, as a result of inductive coupling between the coils in the head H1, ineffectual to give an output at the V1 and V2 nodes. Valves V4 to V6 act in a similar manner to allow information to be read out from track T2 and to inhibit induced writing signals. The valves V1 and V6, and the valves V2 and V5 have common anode resistors R1 and R2 respectively, the current through which is switched from one valve to the other alternately. Consequently, the direct current through the load resistors R1 and R2 remains substantially constant, balance of the valves being obtained by means of high value resistor R3 in the cathode circuit of valves V3 and V4. By the use of this balanced system the transients produced when switching occurs can be reduced.

The outputs from the anodes of valves V1 and V2 during a P2 pulse period, and from the anodes of valves V6 and V5 during a P1 pulse period, these outputs corresponding respectively to "1" and "0" digits as read by the head then reading, are applied over capacitors C3 and C4 to the two-stage balanced amplifier constituted by the valves V7 and V9 for the first stage and valves V8 and V10 for the second stage, inter-stage coupling being by way of capacitors C5 and C6 and balance being obtained by the resistors R4 and R5. The amplified outputs obtained from the anodes of valves V8 and V10 are applied over capacitors C7 and C8 to respective rectifier gating circuits constituted by rectifiers MR9 and MR10 on the one hand and MR12 and MR13 on the other hand. Here these outputs are gated by the clock pulses applied at terminal *c* to produce re-shaped pulse outputs that are applied to cathode follower valves V11 and V12 and from there to the utilization circuit UC.

The "1" and "0" output signals obtained from the utilization circuit for re-storage are applied over capacitors C11 and C12 respectively to the switching circuits constituted by valves V13, V17 (G1, FIG. 1) and V14, V18 (G4, FIG. 1). Valves V13 and V14, which effect switching of the "1" signals, have a common cathode load resistor R32 to which the "1" pulses are applied. Valve V13 has the odd-revolution pulse train P1 applied to its grid at terminal *d* and valve V14 has the even-revolution pulse train P2 applied to its grid at terminal *e*, so that when valve V13 is conducting valve V14 is cut off and vice versa. When a "1" pulse appears at the cathodes of valves V13 and V14 via capacitor C11, the cathode potential of both valves rises to cut off whichever of the two valves is then conducting, this causing a positive going pulse to appear at the anode of this valve. Valves V17 and V18 perform the switching of the "0" pulses in a similar manner. Valves V15 and V16 constitute the writing amplifier for the odd (P1) revolutions and therefore have the outputs from valves V13 and V17 applied to their grids over capacitors C13 and C14. The valves V15 and V16 are biased beyond cut-off. A pulse applied to the grid of the valve V15 from the valve V13 drives valve V15 well into conduction and results in a "1" being written into the track T1 via transformer TR3 and the head H1. Likewise a pulse applied to the grid of valve V16, from valve V17, causes current flow through transformer TR3 in the opposite direction thereby to write a "0" into the track T1. The writing amplifier for the even (P2) revolutions is constituted by the valves V19 and V20 and works in the same fashion, in conjunction with transformer TR4, except that the inputs come from valves V14 and V18 over capacitors C15 and C16.

Figures 7, 8, 9, 10, 11:
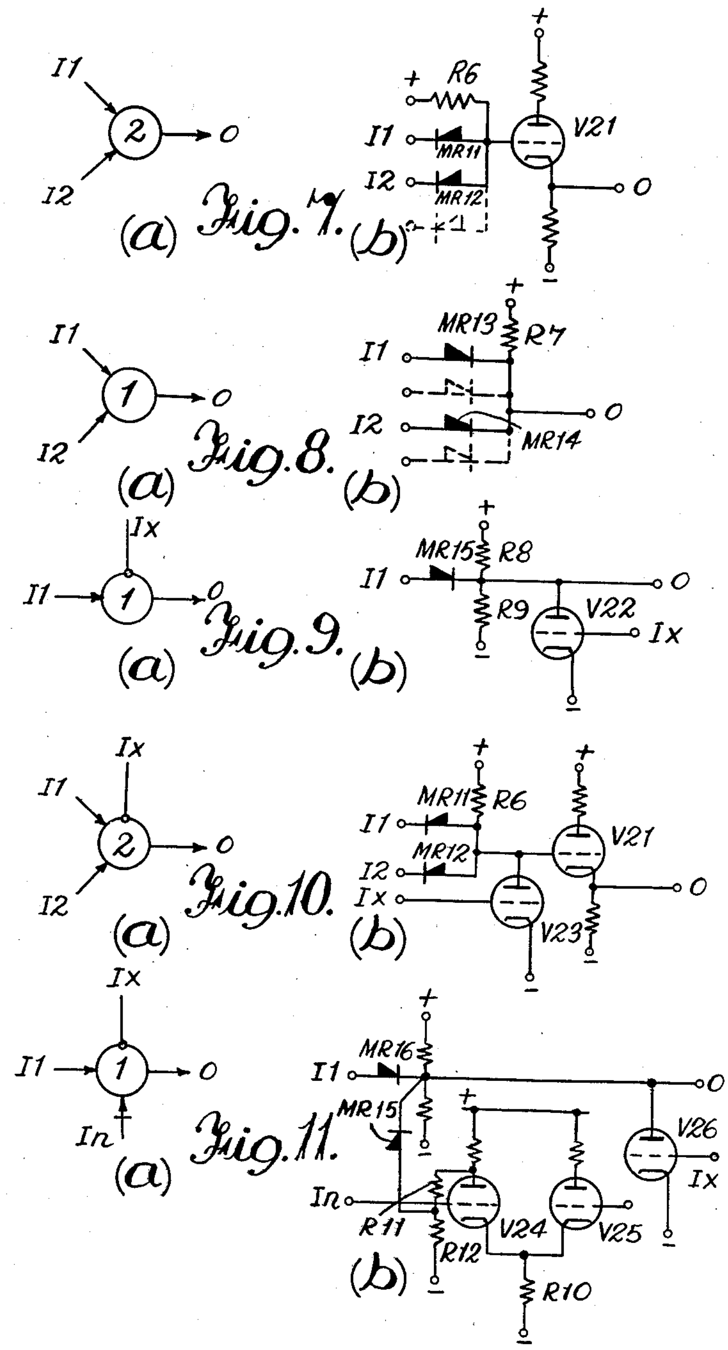

Considering now the detail circuitry for FIGS. 2 and 3, FIG. 7 shows at (*b*) a circuit suitable for the coincidence-of-two gates having the symbol given at (*a*), and not having to effect amplifier switching, namely the gates G21 and G22 in FIG. 3. The gating circuit of FIG. 7(*b*) comprises a simple resistance rectifier gate which feeds a cathode follower valve V21 to give an output at terminal O on coincidence of input signals at terminals I1 and I2. In the absence of an input signal on one or both of the input terminals the positive potential applied through resistor R6 is diverted away from the grid of the valve V21 through the rectifier MR11 and/or the rectifier MR12. The application of a positive input signal on each of the input terminals, however, backs off both rectifiers so that the positive potential applied through the resistor R6 raises the grid potential to cause the valve to conduct and produce an output signal at its cathode. By the addition of a further input rectifier as indicated in dotted lines, the circuit of FIG. 7(*b*) becomes suitable for gates G13 and G14 in FIG. 3.

FIG. 8 shows at (*b*) a circuit suitable for an uninhibited "or" gate having the symbol shown at (*a*), namely gates G9, G11, G17 and G18 in FIG. 3. In the circuit of FIG. 8 the input terminals I1 and I2 are simply connected through respective isolating rectifiers MR13 and MR14 to the output terminal O. In the absence of any input signal a positive potential applied through resistor R7 backs off the rectifiers, but on application of a positive input signal, greater than that applied through resistor R7, to either terminal I1 or terminal I2, the corresponding rectifier MR13 or MR14 conducts and the potential of terminal O is raised accordingly to give an output signal. Addition of further input rectifiers would make this circuit suitable for gates G23 and G24.

FIG. 9 shows at (*b*) a circuit suitable for an "or" gate having an "inhibiting" input lead as represented by the lead (from terminal I*x*) terminating in a small circle on the circumference of the main circle in the symbol given at (*a*). In the circuit of FIG. 9, the, or each, input terminal such as I1 is connected through a rectifier such as MR15 to the junction point of resistors R8 and R9 connected in series between positive and negative terminals. With no signal on the inhibiting lead I*x* a positive signal on terminal I1 is passed by the rectifier MR15 to the output terminal O. A positive inhibiting signal on terminal I*x* however, causes the normally non-conducting valve V22, to the grid of which it is connected, to conduct. This lowers the anode potential of the valve and clamps the potential of the output terminal, thereby preventing the gate from giving an output signal when an input signal appears on the terminal I1. This circuit is suitable for the gates G10 and G12 in FIG. 3.

A coincidence-of-two gate having an inhibiting lead may take the form shown at (*b*) in FIG. 10, the corresponding symbol being indicated at (*a*) and the gates concerned being G15, G16 and G19 in FIG. 3. The rectifiers MR11 and MR12, resistor R6 and valve V21 constitute a normal coincidence-of-two gate having the same connections and operation as already described in connection with FIG. 7. A further valve V23 is, however, connected between the grid of valve V21 and a negative potential terminal and this valve can be rendered conductive by the application to its grid of a positive inhibiting signal applied at terminal I*x*. When the valve V23 is rendered conductive in this way the grid potential of valve V21 is clamped to prevent conduction of this latter valve irrespective of input signals on terminals I1 and I2, thereby preventing an output signal from being obtained at terminal O.

Figure 12:
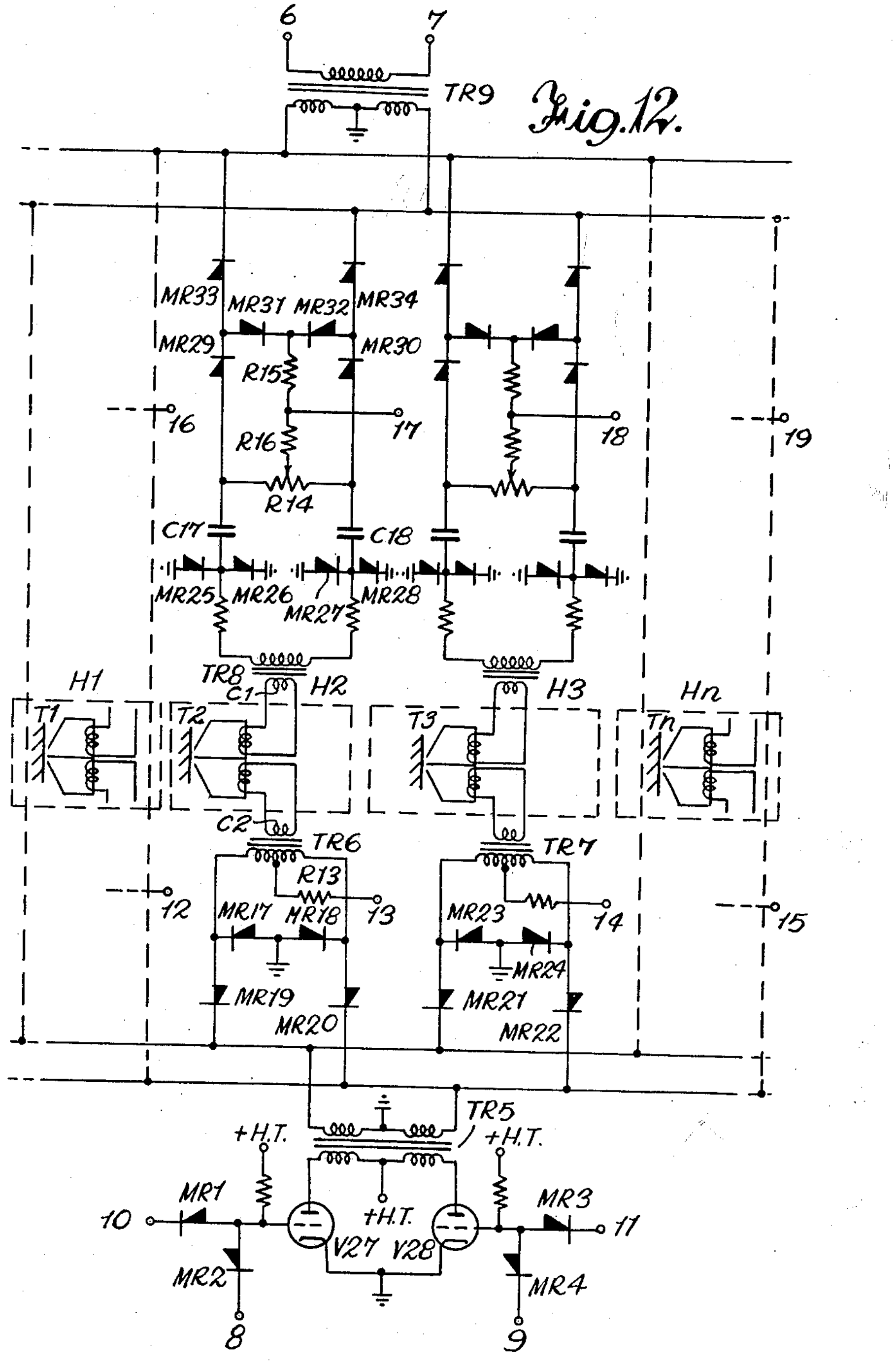

FIG. 11 shows at (*b*) a circuit suitable for an "or" gate having an inhibiting lead and an input lead on which absence of a signal is a stimulus to which the gate responds to give an output signal if uninhibited, this latter lead (I*n*) carrying a transverse line behind its arrowhead in the manner seen in the symbolic representation at (*a*) in FIG. 11. The gate will also, if uninhibited, give an output signal when a signal is present at the input terminal I1. Referring to FIG. 11, the valves V24 and V25 have a common cathode resistor R10 so that when the one valve is conducting the other is non-conducting, and vice versa. In the presence of a signal on lead I*n* connected to the grid of valve V24, this latter valve conducts while valve V25 is non-conducting, resulting in the anode potential of V24, and thus the potential at the junction of resistors R11 and R12, being relatively low. This junction point is connected through an isolating rectifier MR15 to the output terminal at O, which in these circumstances, with no input signal applied to the terminal I1, remains at a correspondingly low potential. A positive input signal applied to terminal I1 will however be passed by rectifier MR16 to raise the potential of the terminal O and thereby provide an output signal if the gate is uninhibited. Also, in the absence of a signal at terminal I*n* valve V24 becomes non-conducting (V25 conducting) and the consequent rise in potential at the junction of resistors R11 and R12 is passed to the output terminal to give an output signal if uninhibited. A positive inhibiting signal at the terminal I*x* causes the valve V26 to conduct and clamp the potential of the output terminal, thereby preventing an output signal from being obtained. The circuit of FIG. 11 is suitable for gate G20 in FIG. 3.

Where a plurality of switching circuits are connected to a common reading or writing amplifier it becomes necessary to provide more elaborate circuits which can readily attenuate any signals other than those which they are required to pass, such switching circuits being required for all the gates of FIG. 2, and the RG and WG gates of FIG. 3. Circuit details for two such gates are shown in FIG. 12 in which a plurality of heads H1 to H*n* sharing a common reading amplifier and common writing amplifier, are typified. Only the switching circuits associated with heads H2 and H3 are shown in detail, the circuit details above the heads being concerned with reading and those below being concerned with writing. Valves V27 and V28 together with their associated components constitute a common writing amplifier: a common reading amplifier is assumed connected to the terminals 6 and 7 but is not shown since it may take any common form.

Referring to FIG. 12, information to be written on to the drum is fed in at terminals 8 and 9 one of which has a postive potential applied if a "1" is to be written while the other is given a positive potential for a "0." The information thus fed in is gated with clock pulses applied at terminals 10 and 11 and is then amplified in the valves V27 and V28. The output signal from the writing amplifier may have to be written into any one of a plurality of storage tracks T1 . . . T*n* via the associated switching circuit and head. It is arranged therefore that the output signal is applied over transformer TR5 to every switching circuit but only the one associated with the track into which the signal is to be written is actuated to pass through the signal to the writing coil of the relevant head.

Actuation of the switching circuits for writing is controlled by switching pulse trains applied respectively to terminals 12, 13, 14, 15 . . . and being, for example, the WSP pulse trains for FIG. 2 or the pulse trains from gates G23 and G24 for FIG. 3. Assuming for the sake of description that the track into which the information is to be written at a given time is T2, a positive switching pulse is applied to terminal 13, at that time. This switching pulse, acting via current limiting resistor R13 connected to the centre of the primary winding of the transformer TR6, backs off rectifiers MR17 and MR18 to make them high resistance and causes rectifiers MR19 and MR20 to conduct and become low resistance. Consequently, the writing information which is induced into the secondary of transformer TR5 can flow via rectifiers MR19 and MR20, which are low resistance, to the primary of transformer TR6. In the switching circuits associated with the other heads, for example head H3, rectifiers MR21 and MR22 are at this time high resistance, since the quiescent potential of terminal 14 is below earth, while rectifiers MR23 and MR24 are low resistance; consequently even if the rectifiers MR21 and MR22 pass a small writing signal, this is short-circuited to earth by the conduction of the rectifiers MR23 and MR24 and does not reach the primary of transformer TR7 (corresponding to transformer TR6). The writing information flowing in the primary of transformer TR6 induces a current in the secondary which flows through the writing coil *c*2 of the head H2 to record the information on the drum in track T2.

For the switching circuits associated with the reading coils similar rectifier switching circuits controlled by pulse trains applied at terminals 16, 17, 18, 19 . . . are used, but in view of the very small voltages available from the reading coils they have to be more sensitive and are therefore centre balanced by means of a variable resistor such as resistor R14 in the switching circuit associated with head H2.

Still considering head H2, output from its reading coil *c*1 is stepped up by transformer TR8 but is limited by the rectifiers MR25 to MR28 to only a small voltage, thereby to ensure that induced currents from the writing circuit will not break down the switching circuit. Capacitors C17 and C18 are included to isolate the switching pulses from the secondary of the transformer TR8. A switching pulse applied at terminal 17 to the junction of the two equal resistors R15 and R16 renders rectifiers MR29 and MR30 conducting to pass the read information, whilst backing off rectifiers MR31 and MR32. As in the case of the switching circuits associated with the writing coils, the conditions of the rectifiers are reversed when no switching pulse is present. Rectifiers MR33 and MR34 serve to isolate the output side of the switching circuit associated with the reading coil of head H2 from other similar switching circuits associated with the reading coils of the other heads. The reading information thus passed through the switching circuit from head H2 is applied to the primary of the transformer TR9, thereby to induce in its secondary a signal which is applied from terminals 6 and 7 to the common reading amplifier, not shown.

Where the information stored in any particular track has, or may have, to be utilized on each revolution of the drum or on both transfer to and return from another track, thus precluding the sharing of one transfer track by a number of storage tracks as in the embodiments of FIGS. 2 and 3, two tracks will be required per utilizaton circuit and only half the storage capacity of the drum will be effectively used. However a certain economy may be effected in the total number of utilization circuits required to deal with the stored information since each one has access to almost the entire contents of one storage track. A small part of the storage capacity of each track will be lost due to the necessity of allowing for the finite time taken to change over the effective connections of the heads with the utilization circuit, but as it is contemplated to do this electronically the change-over time and thus the lost storage capacity can be small.

Whereas various detail circuits have been described and illustrated as employing thermionic valves, it will be appreciated that these valve circuits may if desired be replaced by equivalent transistor circuits, the necessary circuit modifications being thought to be apparent to those skilled in the art.

What I claim is:

1. A magnetic information storage arrangement comprising:

(*a*) a cyclically operable magnetic storage device having at least one continuous storage track and at least one continuous transfer track along each of which information can be stored by selective magnetization of unit surface areas thereof;

(*b*) a utilization circuit having input and output connections;

(*c*) a combined read/write head individual to each track and operable both for reading information from and for writing information into its associated track;

(*d*) means to drive said magnetic storage device to move said continuous storage and transfer tracks past said respective read/write heads in recurrent cycles of movement;

(*e*) pulse means synchronous with said movement of said tracks for providing recurrent pulses each of a duration having a predetermined relationship to said cycles of movement and corresponding to the passage of a predetermined plurality of said unit surface areas past a read/write head;

(*f*) a "read" switching gate individual to each track and connected between the track's read/write head and the input connection to said utilization circuit;

(*g*) a "write" switching gate individual to each track and connected between the track's read/write head and the output connection of said utilization circuit;

(*h*) means connecting non-successive ones of said recurrent pulses as opening pulses to the "write" switching gate of said transfer track and the "read" switching gate of said storage track; and (*i*) means connecting intervening ones of said recurrent pulses as opening pulses to the "read" switching gate of said storage track;

whereby, during each pulse period defined by said non-successive pulses, to permit transfer of information from said storage track to said transfer track through the utilization circuit, and, during each pulse period defined by said intervening pulses, to permit transfer of said information from said transfer track to said storage track through the utilization circuit to substantially the same position as that from which it was originally read.

2. A magnetic information storage device as recited in claim 1, wherein said magnetic storage device is a magnetic storage drum, said cycles of movement are revolutions of said drum, and said recurrent pulses have a duration corresponding to one of said revolutions.

3. A magnetic information storage arrangement comprising:

(*a*) a cyclically operable magnetic storage device having a continuous storage track and a continuous transfer track along each of which information can be stored by selective magnetization of unit surface areas thereof;

(*b*) a utilization circuit having input and output connections;

(*c*) a combined read/write head individual to each track and operable both for reading information from and for writing information into its associated track;

(*d*) means to drive said magnetic storage device to move said continuous storage and transfer tracks past said respective read/write heads in recurrent cycles of movement;

(*e*) pulse means synchronous with said movement of said tracks for providing recurrent pulses each of a duration corresponding to one of said cycles of movement and corresponding to the passage of a predetermined plurality of said unit surface areas past a read/write head;

(*f*) a "read" switching gate individual to each track and connected between the track's read/write head and the input connection to said utilization circuit;

(*g*) a "write" switching gate individual to each track and connected between the track's read/write head and the output connection of said utilization circuit;

(*h*) means connecting alternate one of said recurrent pulses as opening pulses to the "write" switching gate of said transfer track and the "read" switching gate of said storage track; and (*i*) means connecting the intervening ones of said recurrent pulses as opening pulses to the "read" switching gate of said transfer track and the "write" switching gate of said storage track;

whereby, during each pulse period defined by said alternate pulses, to permit transfer of information from said storage track to said transfer track through the utilization circuit, and, during each pulse period defined by said intervening pulses, to permit transfer of said information from said transfer track to said storage track through the utilization circuit to substantially the same position as that from which it was originally read.

4. A magnetic information storage arrangement comprising:

(*a*) a cylically operable magnetic storage device having a plurality of continuous storage tracks and a continuous transfer track along each of which information can be stored by selective magnetization of unit surface areas thereof;

(*b*) a utilization circuit having input and output connections;

(*c*) a combined read/write head individual to each track and operable both for reading information from and for writing information into its associated track;

(*d*) means to drive said magnetic storage device to move said continuous storage and transfer tracks past said respective read/write heads in recurrent cycles of movement;

(*e*) pulse means synchronous with said movement of said tracks for providing recurrent pulses each of a duration corresponding to one of said cycles of movement and corresponding to the passage of a predetermined plurality of said unit surface areas past a read/write head;

(*f*) a "read" switching gate individual to each track and connected between the track's read/write head and the input connection to said utilization circuit;

(*g*) a "write" switching gate individual to each track and connected between the track's read/write head and the output connection of said utilization circuit;

(*h*) means connecting alternate ones of said recurrent pulses as opening pulses to the "write" switching gate of said transfer track and as opening pulses successively in turn to the "read" switching gates of said plurality of storage tracks; and (*i*) means connecting the intervening ones of said recurrent pulses as opening pulses to the "read" switching gate of said transfer track and as opening pulses successively in turn to the "write" switching gates of said plurality of storage tracks;

whereby, during successive pulse periods defined by said alternate pulses, to permit transfer of information from each storage track in turn to said transfer track through the utilization circuit, and, during each pulse period defined by said intervening pulses, to permit transfer of said information from said transfer track to the relevant storage track through the utilization circuit to substantially the same position as that from which it was originally read.

5. A magnetic information storage arrangement comprising:

(*a*) a cyclically operable magnetic storage device having a plurality of continuous storage tracks and two continuous transfer tracks along each of which information can be stored by selective magnetization of unit surface areas thereof;

(*b*) a utilization circuit having input and output connections;

(*c*) a combined read/write head individual to each track and operable both for reading information from and for writing information into its associated track;

(*d*) means to drive said magnetic storage device to move said continuous storage and transfer tracks past said respective read/write heads in recurrent cycles of movement;

(*e*) pulse means synchronous with said movement of said tracks for providing recurrent pulses each of a duration corresponding to one of said cycles of movement and corresponding to the passage of a predetermined plurality of said unit surface areas past a read/write head;

(*f*) "read" switching gate means individual to each transfer track;

(*g*) "read" switching gate means individual to each storage track and connected between the track's read/write head and the input connection to said utilization circuit;

(*h*) "write" switching gate means individual to each transfer track and connected between the track's read/write head and the output connection of said utilization circuit;

(*i*) "write" switching gate means individual to each storage track and connected in series with the "read" switching gate means of each transfer track between the transfer track's read/write head and the storage track's read/write head;

(*j*) means connecting alternate ones of said recurrent pulses as opening pulses to the "write" switching gate means of one transfer track and the "read" switching gate means of the other transfer track;

(*k*) means connecting the intervening ones of said recurrent pulses as opening pulses to the "read" switching gate means of said one transfer track and the "write" switching gate means of said other transfer track;

(*l*) means connecting said recurrent pulses as opening pulses successively in turn to the "read" switching gate means of said plurality of storage tracks; and (*m*) means connecting said recurrent pulses as opening pulses successively in turn to the "write" switching gate means of said plurality of storage tracks, the pulse applied to the "write" switching gate means of each storage track occurring in the pulse period next following that in which the pulse applied to the "read" switching gate means for that storage track occurs;

whereby, during successive pulse periods defined by said recurrent pulses, to permit transfer of information from successive storage tracks in turn to alternate ones of said transfer tracks through the utilization circuit and transfer of said information from the transfer tracks to the relevant storage track to substantially the same position as that from which it was originally read.

6. A magnetic information storage arrangement as claimed in claim 1, wherein each of said combined read/write heads comprises separate writing and reading coils linked with respective magnetic circuits defining respective gaps disposed close to the magnetic surface of the storage device and so spaced in relation to the speed of movement of the storage device that the time for a unit surface area along a track of said device to pass from the reading gap to the writing gap of the associated track head is approximately equal to or slightly greater than the time taken for an item of information read from a single unit surface area to pass from a "reading" head through the utilization circuit to a "writing" head.

References Cited in the file of this patent

UNITED STATES PATENTS

| | | |
|---|---|---|
| 2,614,169 | Cohen | Oct. 14, 1952 |
| 2,734,186 | Williams | Feb. 7, 1956 |
| 2,796,597 | Poorte et al. | June 18, 1957 |
| 2,832,064 | Lubkin | Apr. 22, 1958 |
| 2,855,146 | Henning et al. | Oct. 7, 1958 |